March 22, 1960 — C. T. HUTCHENS — 2,929,618
SUSPENSION MEANS
Filed March 6, 1959 — 3 Sheets-Sheet 1
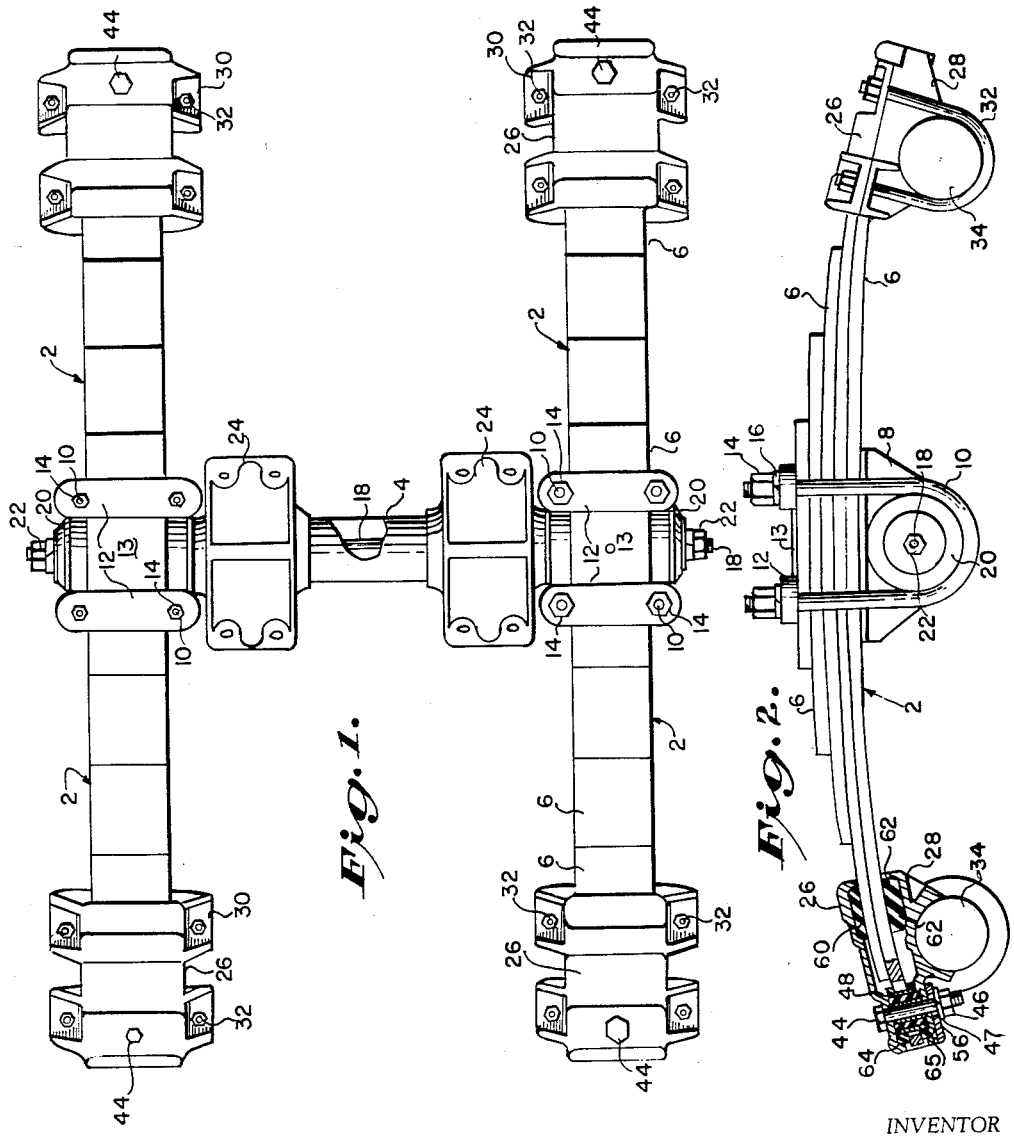
INVENTOR
CHARLES T. HUTCHENS
BY Cushman, Darby & Cushman
ATTORNEYS

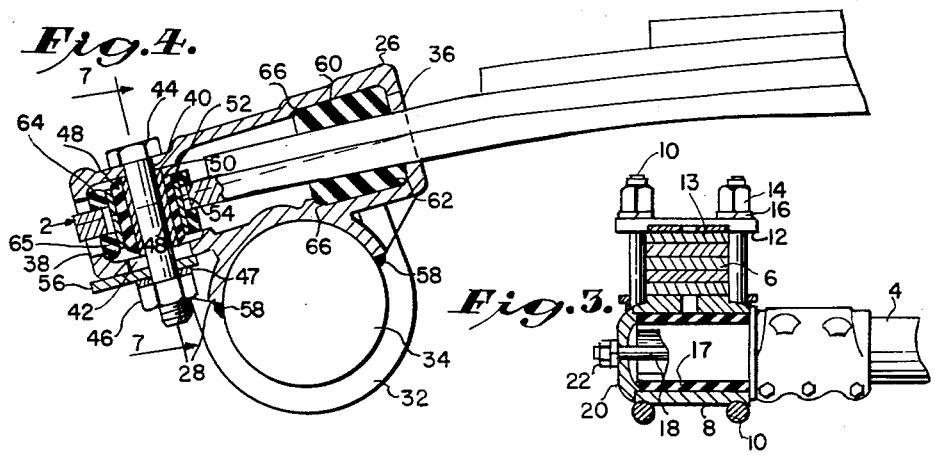
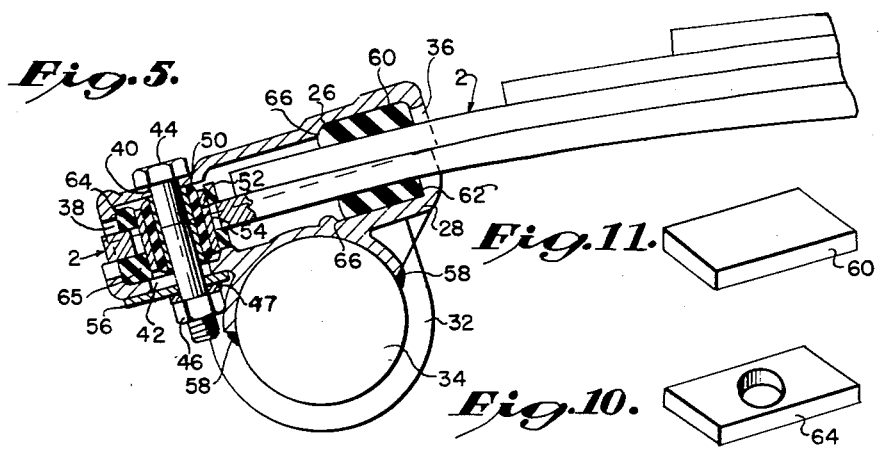
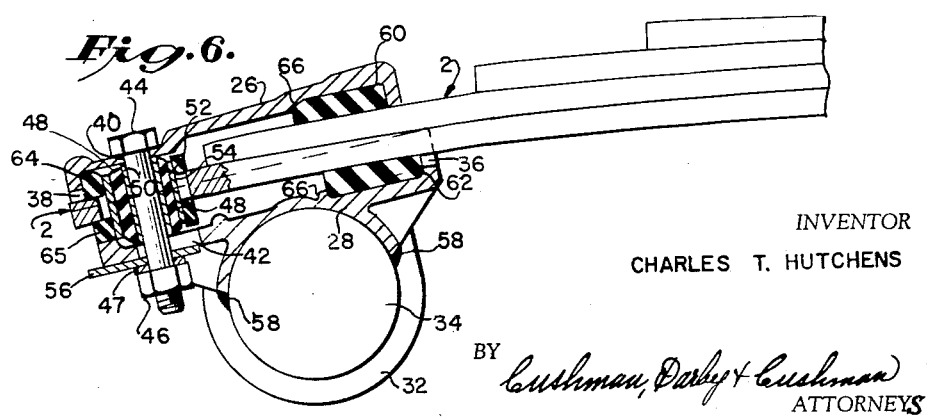

March 22, 1960
C. T. HUTCHENS
2,929,618
SUSPENSION MEANS
Filed March 6, 1959
3 Sheets-Sheet 3
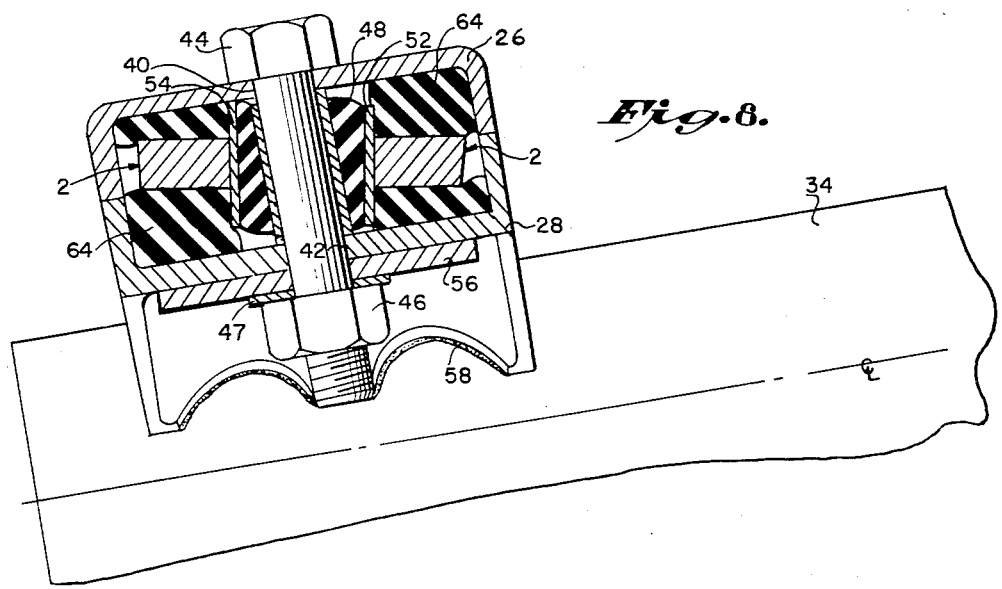
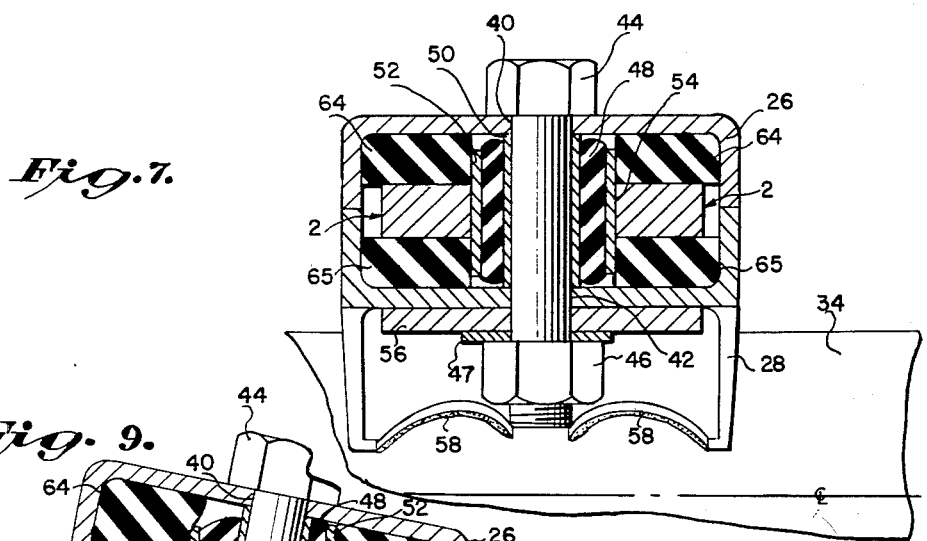
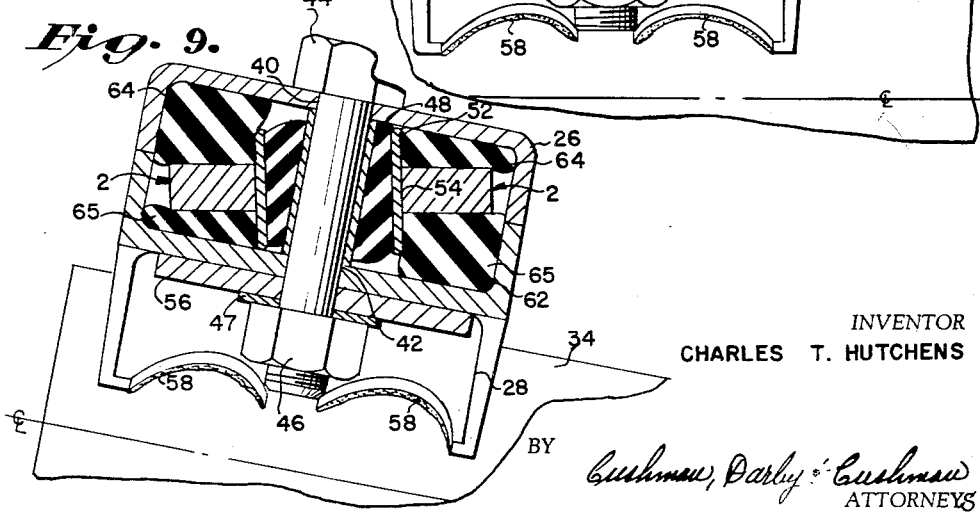
INVENTOR
CHARLES T. HUTCHENS
BY
Cushman, Darby & Cushman
ATTORNEYS United States Patent Office 2,929,618
Patented Mar. 22, 1960

2,929,618

SUSPENSION MEANS

Charles T. Hutchens, Springfield, Mo.

Application March 6, 1959, Serial No. 797,626

5 Claims. (Cl. 267—30)

This invention relates to a means for yieldably and adjustably connecting a vehicle leaf spring to an axle of a vehicle, and more particularly to a means for connecting the ends of a vehicle leaf spring to a pair of axles arranged in tandem.

The principal object of this invention is to provide a multi-joint means between a vehicle leaf spring and an axle that will allow the joint to be adjusted so as to bring two non-parallel axles into parallelism and to positively hold them in that condition.

A further object of this invention is to provide a resilient connection between a vehicle leaf spring and one of two axles arranged in tandem that will permit the spring to tilt or turn sidewise as when one of the wheels carried by the axle climbs over an obstruction or drops below the ground level into a hole.

A still further object of the invention is to provide a connection of the character described herein which comprises but few parts and is easily assembled and adjusted.

Other objects will appear hereinafter throughout the specification.

Referring to the drawings:

Figure 1 is a top plan view of a dual spring unit for flexibly and adjustably connecting two truck or trailer axles arranged in tandem;

Figure 2 is a side elevation of one of the springs used in my invention and with parts in vertical section, showing the means for connecting the ends of the spring to a pair of axles, and also the means for connecting the central portions of the springs to a trunnion means carried by a vehicle;

Figure 3 is a detail view of one of the connections between the central portion of a spring and the trunnion means, showing certain parts in section and others in elevation;

Figure 4 is a detail view of one of the connections between the end of a spring and one of the axles, showing certain parts in section and others in elevation;

Figure 5 is a view similar to Figure 4 but showing a different position of adjustment of the spring casing sections;

Figure 6 is a view similar to Figure 5 but showing still another position of adjustment of the spring casing sections;

Figure 7 is a view in section taken on the line 7—7 of Figure 4;

Figure 8 is a view similar to Figure 7 showing the position of certain parts when the spring is canted in one direction;

Figure 9 is a view similar to Figure 8 showing the position of the same when the spring is canted in the opposite direction;

Figure 10 is a perspective view of one of the rubber pads used in each of the connections between an axle and an end of a spring; and Figure 11 is a view similar to Figure 10 showing another rubber pad used in each connection.

In the drawings, 2 represents the springs used in my invention and 4 the trunnion to which the central portions of the springs are connected. As shown in Figure 2, each spring is made up of five leaves 6 but it will be understood that the number of leaves is not critical and may be varied as desired. The springs 2 are each secured to the trunnion member 4 by the saddle member 8 which engages the lower side of the spring and is contoured adjacent its ends to receive the pair of U-bolts 10. As indicated in Figures 1 and 2, the bolts 10 are tied together at their upper ends by the cross bars 12 which connect corresponding legs of the pair of U-bolts and span the top of the spring 2 and the clamping plate 13. Nuts 14 and washers 16 serve to clamp the spring between the saddle member 8 and the bars 12. As indicated in Figure 1 the trunnion member 4 is of tubular form and is supported at its ends in the lower portion of the U-bolts 10 by which it is clamped in the saddle member 8. If desired, a rubber bushing 17 may be mounted between the saddle member 8 and the trunnion 4. To further prevent endwise movement of the trunnion member 4, a rod 18 extends therethrough and beyond the ends thereof to receive the cap members 20 which are forced against the saddle members 8 by nuts 22 arranged on the threaded ends of the rod to clamp the cap members 20 against the saddle members and the end of the trunnion member 4. Hanger members 24 are carried by the trunnion member 4 and are adapted for connection to the vehicle frame.

Referring now to the adjustable unit which attaches each of the springs 2 to the adjacent axle, 26 represents the upper section of the spring housing which houses the end portion of the spring 2, and 28 the lower section. As shown in Figures 1 and 2, the housing sections 26 and 28 are provided with laterally projecting ears 30 which receive U-bolts 32 to clamp the sections together and onto the corresponding axle 34. The housing formed by the upper and lower sections 26 and 28 is open at both ends as shown, for example, in Figure 4 and these openings receive the end of the spring 2. These openings are considerably larger than the overall cross section of the spring so that the spring is loosely received therein, the inner opening 36 being larger than the outer opening 38 to receive two spring leaves instead of one as is the case with the opening 38. Alined openings 40 and 42 are formed in the sections 26 and 28, respectively to receive the vertically arranged bolt 44 which is snugly fitted in the opening 40 and is threaded at its lower end to receive the nut 46 and the washer 47. Mounted in the housing and telescoped over the bolt 44 is a resilient rubber bushing 48 which carries two metallic sleeves, one being confined in the bushing 48 and the other surrounding it. The inner sleeve 50 is longer than the outer sleeve and serves to prevent wear of the rubber bushing by the bolt 44. The outer sleeve 52 is shorter than the inner sleeve to permit the rubber bushing 48 to be deformed by the spring 2 as indicated in Figures 8 and 9. The sleeve 52 also protects the rubber bushing from wear by the contacting sides of the opening 54 in the spring through which the bushing extends. As clearly shown in Figures 3, 4 and 5, the lower opening 42 in the housing is larger than the upper opening 40 and is elongated to allow lengthwise adjustment of the lower section 28 with respect to the upper section 26. If on assembly of the spring connection described, it should be found that one axle 34 is not at right angles to the vehicle and not parallel to the other axle, the bolt 44 may be loosened and the lower section 28 shifted either inwardly or outwardly. Since the axle 34 is rigidly clamped to the lower section 28 by the U-bolts 32, it must move with it, with the result that movement of the lower section causes the attached axle 34 to be moved forwardly or rearwardly with respect to the upper section 26 and the end of the spring. The position of the housing sections when the lower section 28 is moved forwardly is illustrated in Figure 5, and the position of the parts when this section is moved rearwardly is shown in Figure 6. When the sections have been adjusted either forwardly or rearwardly to bring the axles into parallelism, the bolt 44 is tightened and the adjustment plate 56, which is provided with an opening through which the bolt 44 passes with a tight fit, is welded or otherwise rigidly secured to the lower face of the lower section 28 to hold the parts in the desired position of adjustment. Also, the edges of the lower housing section 28 may be welded to the axle as indicated at 58, if desired.

In order to enable an axle to tilt to allow the wheel on one end of the axle to climb over an obstacle while the wheel on the other end of the same axle is on level ground or even drops into a hole below the level of the ground, I have provided the inner end of the spring housing with a resilient rubber pad 60 above the end of the spring 2 and a similar pad 62 below the spring as clearly indicated in Figures 7, 8 and 9, while the outer end of the housing is provided with a pair of perforated resilient rubber pads 64 and 65 arranged around the bushing sleeve 52. As shown in Figure 7, the pads 64 and 65 are normally flat and are disposed one above and the other below the end of the spring. This figure shows the position of the parts in the housing when the pair of wheels on the axle are on level ground and with the axle in a horizontal position, while Figure 8 shows the position of the parts when the pads 60, 62, 64 and 65, and the rubber bushing 48 around the bolt 44 are deformed when the wheel on the adjacent end of the axle drops into a hole or the wheel on the opposite ends of the axle climbs over an obstruction. Figure 9 shows the position of the parts when the reverse action of the axle and its wheels takes place. This condition occurs when the adjacent wheel climbs over an obstruction and the remote wheel drops into a hole. While the pads 60 and 62 are shown as confined against movement axially of the spring housing by the annular end wall of the housing and the shoulders 66, it will be understood that some other means could be used, if desired.

Referring to the feature of the invention which allows axles out of parallelism to be brought into and secured in parallel relation, it will be understood that if during service the parts should be broken in a manner such that the axles are no longer parallel, the adjustment plate 56 may be removed and the parts repaired. After repair the plate 56 may again be welded or otherwise rigidly secured on the lower housing section.

The term "rubber" used in the above description is intended to include not only resilient and distortable rubber but also any synthetic rubber or other material suitable for the purpose described.

The above description and drawings disclose one embodiment of the invention, and specific language has been employed in describing the figures. It will, nevertheless, be understood that no limitations of the scope of the invention are thereby contemplated, and that various alterations and modifications may be made as would occur to one skilled in the art to which the invention relates.

I claim:

1. The combination with a vehicle leaf spring of a means for connecting an end of said spring to an axle comprising an elongated housing, said housing being provided with an opening in each end, said leaf spring extending through said housing, said housing having an upper and a lower section, means for clamping said sections together, said sections and said spring being provided with vertically aligned apertures, a bolt extending through said apertures, a nut threaded on one end of said bolt, the aperture in said lower section being elongated longitudinally of said housing to form a slot so that said lower section may be adjusted with respect to said upper section, a resilient rubber bushing mounted in the aperture in said leaf spring and around said bolt, an adjustment plate carried by the lower end of said bolt and normally held in engagement with the lower side of said lower section, said plate being adapted to be welded to said lower section to hold said lower section in an adjusted position on said upper section.

2. The combination with a vehicle leaf spring of a means for connecting an end of said spring to an axle comprising an elongated housing, said housing being provided with an opening in each end, said leaf spring extending through said housing, said housing having an upper and a lower section, means for clamping said sections together, said sections and said spring being provided with vertically aligned apertures, a bolt extending through said apertures, a nut threaded on one end of said bolt, the aperture in said lower section being elongated longitudinally of said housing to form a slot so that said lower section may be adjusted in opposite directions on said bolt and on said upper section, a resilient rubber bushing mounted in the aperture in said spring and around said bolt, a metallic sleeve lining said bushing and contacting said bolt, a second metallic sleeve mounted on the outer peripheral surface of said bushing for engaging the wall of the aperture in said spring, an adjustment plate having a hole therethrough closely fitting said bolt and normally engaging the lower face of said lower section, said plate being adapted to be rigidly attached to said lower section to hold said lower section in an adjusted position on said upper section and said bolt.

3. The combination with a vehicle leaf spring of a means for connecting an end of said spring to an axle comprising an elongated housing, said leaf spring extending through said housing, said housing having an upper and a lower section, means for clamping said sections together comprising mating ears on said sections and bolt means extending through said ears, said sections and said spring being provided with vertically aligned apertures, a bolt extending through said apertures and a nut threaded on one end of said bolt, the aperture in said lower section having a width substantially equal to the diameter of said bolt and a length substantially greater than its width and extending longitudinally of said lower section so that said lower section may be adjusted in opposite directions on said bolt and longitudinally of said upper section, a resilient rubber bushing mounted in the aperture in said spring and around said bolt, wear-protecting means between said bushing and said bolt, and a second wear-protecting means between said bushing and the wall of said aperture in said spring, an adjustment plate having a hole therethrough closely fitting said bolt and normally engaging the lower face of said lower section, said plate being adapted to be welded to said lower section to hold said lower section in an adjusted position on said upper section and said bolt.

4. The combination with a vehicle leaf spring of a means for connecting one end of said spring to an axle comprising an elongated housing, said leaf spring extending through said housing, said housing having an upper and a lower section, means for clamping said sections together, said sections and said spring being provided with vertically aligned apertures, a bolt extending through said apertures and a nut threaded on one end of said bolt, the aperture in said lower section being elongated longitudinally of said housing to form a slot so that said lower section may be adjusted with respect to said upper section, a resilient rubber bushing mounted in the aperture in said spring and around said bolt, an adjustment plate having a hole therethrough closely fitting said bolt and normally engaging the lower face of said lower section, said plate being adapted to be rigidly attached to said lower section to hold said lower section in an adjusted position on said upper section, said section having a groove in its lower face to fit the outer surface of a vehicle axle.

5. The combination with a vehicle leaf spring of a means for connecting one end of said spring to an axle comprising an elongated housing, said leaf spring extending through said housing, said housing having an upper and a lower section, means for clamping said sections together, said sections and said spring being provided with vertically aligned apertures, a bolt extending through said apertures and a nut threaded on one end of said bolt, the aperture in said lower section being elongated longitudinally of said housing to form a slot so that said lower section may be adjusted with respect to said upper section, a resilient rubber bushing mounted in the aperture in said spring and around said bolt, an adjustment plate having a hole therethrough closely fitting said bolt and normally engaging the lower face of said lower section, said plate being adapted to be attached by a weld to said lower section to hold said lower section in an adjusted position on said upper section, and a cushioning means mounted above and below said spring in said housing, said cushioning means comprising a first resilient rubber pad confined between the upper face of said spring and said upper section, and a second resilient pad confined between the lower face of said spring and said lower section, said rubber pads together with said rubber bushing forming a resilient connection between said housing and said spring which will allow said spring to tilt about its axis as well as move up and down on said bolt.

References Cited in the file of this patent

UNITED STATES PATENTS

| | | |
|---|---|---|
| 1,708,221 | Geyer | Aug. 9, 1929 |
| 2,049,555 | Zaparka | Aug. 4, 1936 |
| 2,284,646 | Eidal | June 2, 1942 |

FOREIGN PATENTS

| | | |
|---|---|---|
| 735,166 | Great Britain | Aug. 17, 1955 |